: # 2,935,477

LUBRICATING GREASE COMPOSITION CONTAINING A METAL SALT OF A LOW MOLECULAR WEIGHT CARBOXYLIC ACID AND POLYETHYLENE

Arnold J. Morway, Clark, N.J., assignor to Esso Research and Engineering Company, a corporation of Delaware No Drawing. Application November 30, 1955
Serial No. 550,174

7 Claims. (Cl. 252—39)

This invention relates to lubricating compositions, and particularly to lubricating grease compositions containing a metal salt of a low molecular weight carboxylic acid. More specifically, this invention pertains to the stabilization of a colloidal dispersion of an alkaline earth metal salt of acetic acid in a lubricating oil thickened to grease consistency with a polyethylene resin.

Metal salts of low molecular weight carboxylic acids such as calcium acetate can be dispersed in colloidal particle size in lubricating oils, but the resulting colloidal dispersions tend to be rather unstable when employed under ordinary lubricating conditions. These dispersions have relatively good structure and stability when the water of reaction is retained. Upon removal of the water of reaction, however, the grease loses its solid structure and softens. On cooling the dehydrated grease, large clumps of agglomerated calcium acetate crystals settle out of the colloidal dispersion.

In accordance with this invention, it has now been found that lubricating grease compositions having a high degree of stability and high dropping points can be prepared by forming or dispersing a metal salt of a low molecular weight carboxylic acid in a lubricating oil containing a minor amount of a polyethylene resin. In addition to the above properties the lubricating grease compositions of the invention maintain their solid structure even when the grease is dehydrated. The polyethylene resin also acts to prevent calcium acetate crystals from agglomerating into large clumps which would settle out of the colloidal dispersion. Another feature of this invention relates to the stabilization of colloidal dispersion of salts in lubricating oil with small amounts of silica gel or amorphous silica, as hereinafter described.

The polyethylene resins utilized in the preparation of the greases of this invention are known in the art. Techniques for the polymerization of ethylene into various resinous compounds are old. Some of these techniques are described in detail in U.S. Patent No. 2,153,553. In general, the formation of the polyethylene resins is accomplished by subjecting ethylene to temperatures in the neighborhood of about 200° C. to 600° C. and pressures of about 200 atmospheres or more. The polyethylene resins useful in this invention are those having a molecular weight within a range of from about 6,000 to 50,000 Staudinger. Polyethylene resins with a molecular weight of from about 10,000 to 22,000 Staudinger are utilized in preparing the preferred lubricating grease compositions of the invention.

The polyethylene employed in this invention may also be prepared by polymerizing ethylene in the presence of a catalyst obtained by mixing a compound having reducing properties with a reducible compound of a heavy metal. These particular polyethylenes have been found to have unique structures and properties in that the polyethylene molecules are almost completely linear and have practically no branched chains, at most about three branched methyl groups for every hundred carbon atoms in the linear chain and usually only about one methyl group for every hundred carbon atoms. In addition, the polyethylene molecules have only a small amount of unsaturation, generally less than about 0.5 double bond for every hundred carbon atoms. These particular polyethylene resins have a molecular weight of at least about 10,000. Polyethylenes having molecular weights in the range of about 20,000 to 1,000,000, preferably about 20,000 to 200,000, are especially useful in preparing the lubricating compositions encompassed by this invention. The molecular weight referred to with respect to these particular polyethylenes are obtained by determining the intrinsic viscosity and referring to the Harris correlation graph disclosed in volume 8, page 361, of the "Journal of Polymer Science" (1952).

The polymerizing catalyst employed in preparing these particular polyethylenes generally is obtained by mixing a reducing compound such as a compound of aluminum (e.g. aluminum triethyl) and a reducible compound of a heavy metal (e.g. titanium tetrachloride) in the presence of an inert liquid diluent. The catalyst mixture will preferably contain a molar ratio of the reducing compound to the reducible heavy metal compound in the range of about 0.5:1 to 8:1, preferably about 1:1 to 4:1.

The amount of the polyethylene resin incorporated in the grease compositions of the invention will ordinarily be within the range of about 0.5 to 10 wt. percent, based on the weight of the total composition. Preferably about 1 to 5 wt. percent of the polyethylene resin, based on the weight of the total composition, will be employed. In general, as the molecular weight of the polyethylene resin increases smaller amounts can be employed to obtain lubricating grease compositions having similar structural stability and dropping point characteristics.

The lubricating oil which may be used as the menstruum for dispersing the thickening agents of this invention may be any of the well known lubricating oils with which the art is familiar. Petroleum distillates from either naphthenic or paraffinic base stocks having a viscosity from about 35 to 250 SUS at 210° F. as well as mixtures of the same may be employed. Animal and vegetable oils rather than mineral lubricating oils may also be employed as the oil menstruum. It has also been found that if a small amount of a mineral lubricating oil is used as a dispersant for the polyethylene resin and the metal salt, a stable lubricating grease may be obtained with a synthetic lubricating oil base such as, for example, hydrocarbon polymers, diesters, complex esters, formals, mercaptals, polyalkylene oxides, silicones, etc. More particularly, synthetic oils such as di-2-ethylhexyl sebacate, di-C$_8$ Oxo azelate and other branched chain diesters of dicarboxylic acids as well as complex esters prepared from glycols, dicarboxylic acids, and alcohols or monocarboxylic acids can be used in preparing the lubricating grease compositions of the invention. In general, the lubricating oil will constitute about 50 to 90 wt. percent, preferably about 55 to 85 wt. percent, based on the weight of the total grease composition.

The salt portion of the greases of the invention include the metal salts of low molecular weight aliphatic carboxylic acids having from about 1 to 3 carbon atoms per molecule. Operable metals include the alkali metals: sodium, potassium and lithium; and the alkaline earth metals: calcium, barium, strontium and magnesium. The alkaline earth metals are preferred, and calcium is especially preferred in preparing the lubricating greases of the invention. The low molecular weight carboxylic acids may be selected from such saturated and unsaturated acids as formic, acetic, propionic, acrylic, etc. Acetic acid is the preferred carboxylic acid of this invention. The amount of metal salt employed will vary from about 5 to 40 wt. percent, preferably from about 10 to 25 wt. percent, based on the total weight of the grease composition. The low molecular weight carboxylic acid will generally be employed in amounts within the range of about 4 to 30 wt. percent, preferably about 10 to 20 wt. percent, based on the weight of the total grease composition.

In general, the lubricating greases of the invention are prepared by dispersing the polyethylene resin in the lubricating oil base and heating the mixture to a temperature above the melting point of the resin, i.e. about 300° to 450° F., for about 0.5 to 2 hours. The resulting mixture is then cooled to a temperature of about 80° to 110° F., and the alkali or alkaline earth metal hydroxide or carbonate added with stirring. The low molecular weight aliphatic carboxylic acid is then added with continued stirring. The temperature will rise to about 180° to 210° F., and stirring is continued until the temperature of the resulting grease composition subsides.

The invention will be more fully understood by reference to the following examples illustrating various modifications of the invention.

EXAMPLE I

A grease was prepared from the following ingredients:

Formulation: Wt. percent
- Glasial acetic acid_____ 20.0
- Hydrated lime_____ 13.4
- Polyethylene resin (18,000 M.W.)_____ 3.3
- Mineral lubricating oil 80 SUS @ 210° F.__ 63.3

Preparation.—The polyethylene resin was dispersed in the mineral lubricating oil with mixing while heating to about 300° F. for 2 hours. The dispersion was then cooled to room temperature, and the hydrated lime added while mixing intimately to a smooth, non-lumpy consistency. To this mixture the acetic acid was added while stirring. A solid grease formed immediately, and the temperature rose to about 200° F. Stirring was continued until the temperature subsided. The resulting grease was cooled to room temperature.

Properties:
- Appearance_____ Smooth, uniform lubricant.
- Penetration, 77° F. mm./10—
  - Unworked_____ 275.
  - Worked 60 strokes_ 320.
  - Worked 100,000 strokes_____ 355.
- Dropping point_____ None.
- Phase changes_____ (¹)
- Penetration, 77° F. mm./10—Unworked after dehydration____ 300.
- E.P. Properties—Timken test, 40 lbs._____ Fairly wide scar.
- Norma-Hoffman oxidation test ² (hrs. to 5 p.s.i. drop)_____ 336.

¹ Up to 400° F. Slight tendency to thin out or become softer after removal of water. On cooling, no agglomeration of calcium acetate crystals as occurs when polyethylene is absent. Dehydrated product somewhat softer than hydrated product.
² 0.5% phenyl alpha-naphthylamine added to the grease before these tests.

The above data show that a lubricating grease composition having a high dropping point and stability over a wide temperature range can be prepared by utilizing polyethylene resins to stabilize colloidal dispersions of metal salts of low molecular weight carboxylic acids in lubricating oils. As further shown above, the lubricating grease composition of the invention also has excellent extreme pressure properties.

The polyethylene resins have also been found to be particularly useful when mineral acids such as nitric and sulphuric acids are employed in conjunction with the low molecular weight carboxylic acid to prepare lubricating grease compositions encompassed by the invention. Other strong inorganic acids that may also be employed include phosphoric acid and hydrochloric acid. When conventional soap thickeners or stabilizers are employed in combination with strong inorganic acids the latter tend to react with the soap thickener. Polyethylene resins are, however, not affected by the strong inorganic acids. This is shown in the following example.

EXAMPLE II

| Formulation (Wt. Percent) | Grease A | Grease B | Grease C |
|---|---|---|---|
| Glacial acetic acid | 14.0 | 14.0 | 14.0 |
| Nitric acid (70%) | 8.6 | 8.6 | -------- |
| Sulphuric Acid (97%) | -------- | -------- | 6.0 |
| Hydrated lime | 15.1 | 15.1 | 14.1 |
| Aluminum stearate | 3.1 | -------- | -------- |
| Polyethylene resin (20,000 M.W.) | -------- | 3.1 | 3.3 |
| Phenyl alpha-naphthylamine | 0.6 | 0.5 | 0.5 |
| Mineral lubricating oil, 55 SUS @ 210° F. | 58.6 | 58.7 | 62.1 |

Preparation.—Grease A was prepared by dispersing aluminum stearate in the mineral lubricating oil by heating to a temperature of about 300° F. with stirring. The dispersion was cooled to room temperature, and then the hydrated lime was added by blending to a smooth slurry. The acetic acid and nitric acid were then added to the grease mixture. The temperature rose to about 190° F., and the resulting grease mixture was then cooled to room temperature and Gaulin homogenized at 5000 p.s.i.g.

Greases B and C were prepared by dispersing the polyethylene resin in the lubricating oil at a temperature of about 300° F. The dispersion is quickly cooled to obtain a soft grease-like mass. To this semi-solid product, the hydrated lime was added and a smooth dispersion formed. The mixed acids were then added with mixing. The temperature rose to about 210° F., and the mixing is continued until the temperature started to subside. The phenyl alpha-naphthylamine was then added, and the grease product stirred until cooled. The grease was finished by Gaulin homogenization at 5000 p.s.i.g.

Table I

| | Grease A | Grease B | Grease C |
|---|---|---|---|
| Properties: | | | |
| Appearance | Smooth, uniform products | | Excellent. |
| Color | Bright red | Brownish yellow. | |
| Penetrations, 77° F. mm./10: | | | |
| Unworked | 200 | 200 | 275. |
| Worked 60 strokes | 260 | 275 | 295. |
| Worked 100,000 strokes | Semi-fluid | 285 | 345. |
| Water Solubility (Boiling Water, 10 minutes). | Insoluble | | |

When inorganic acids such as nitric acid and sulphuric acid are employed in preparing the grease compositions of the invention, they are generally employed in an amount within the range of about 0.5 to 10 wt. percent, preferably about 5 to 10 wt. percent, based on the weight of the total composition. Lubricating grease compositions within the scope of this invention will contain about 5 to 20 wt. percent, preferably about 8 to 15 wt. percent, of the metal salts of the inorganic acids.

As previously noted, colloidal dispersions of metal salts of low molecular weight aliphatic carboxylic acids, either alone or combined with strong inorganic acids, may also be stabilized through the use of small amounts, preferably about 1 to 4 wt. percent of amorphous silica or silica gel. Precoating the silica or silica gel with water repellents to give materials sold under the trade name "Estersil" as described in U.S. Patent No. 2,676,148 may be advantageous in that the final grease composition will have greater water repellency.

In general, these lubricating grease compositions are prepared by dispersing the amorphous silica or silica gel in mineral lubricating oil by stirring without the addition of heat. To this dispersion hydrated lime is added and a smooth dispersion of the lime in the mineral oil-silica gel dispersion is formed by stirring. While continuing the stirring, the acid or mixed acids are added with no addition of heat. When the temperature of reaction has subsided, the grease is homogenized either through a Gaulin homogenizer or Morehouse mill. Conventional grease additives, such as phenyl alpha-naphthylamine, may be incorporated in these lubricating greases while they are still hot.

The amorphous silica or silica gel are not to be taken as equivalents for the polyethylene resins disclosed above, though it is within the scope of this invention to employ these stabilizing agents in conjunction with each other.

This aspect of the invention is more fully described in the following examples:

EXAMPLE III

A grease was prepared from the following ingredients:

Formulation: Percent weight
  Glacial acetic acid _____ 20.0
  Silica gel _____ 3.3
  Hydrated lime _____ 13.4
  Phenyl alpha-naphthylamine _____ 0.5
  Mineral lubricating oil 55 SUS @ 210° F____ 62.8

*Preparation.*—The mineral lubricating oil and the silica gel were charged to a grease kettle with stirring to obtain a relatively smooth dispersion of the silica gel in the oil. The hydrated lime was then added and intimately mixed into the silica gel-oil dispersion. The acetic acid was charged to the grease kettle with stirring. A solid grease forms almost immediately with the temperature rising to about 200° F. Phenyl alpha-naphthylamine was then added, and the stirring was continued until the temperature subsided. The resulting grease composition was then homogenized by passage through a Gaulin homogenizer to form the final grease composition.

EXAMPLE IV

Formulation: Percent weight
  Glacial acetic acid _____ 14.0
  Amorphous silica _____ 3.3
  Hydrated lime _____ 15.2
  Phosphoric acid (85% conc.) _____ 6.0
  Phenyl alpha-naphthylamine _____ 0.5
  Mineral lubricating oil 55 SUS @ 210° F____ 61.0

This grease was prepared in a manner similar to that described in Example III except that a mixture of acetic acid and phosphoric acid was employed.

EXAMPLE V

Formulation: Percent weight
  Glacial acetic acid _____ 14.0
  Estersil [1] _____ 3.1
  Hydrated lime _____ 15.1
  Nitric acid (70% conc.) _____ 8.6
  Phenyl alpha naphthylamine _____ 0.6
  Mineral lubricating oil 55 SUS @ 210° F____ 58.6

[1] Estersil (Du Pont trade name), a butyl alcohol treated silica gel.

This grease was also prepared in a manner similar to that described in Example III except that a mixture of acetic acid and nitric acid was employed.

The properties of the lubricating grease compositions of Examples III to IV are outlined below.

Table II

| Properties | Grease III | Grease IV | Grease V |
|---|---|---|---|
| Appearance | Excellent, smooth grease | | |
| Penetrations, 77° F. mm./10: | | | |
| Unworked | 260 | 280 | 300 |
| Worked 60 strokes | 300 | 320 | 310 |
| Worked 100,000 strokes | 330 | 350 | 360 |
| Dropping Point, ° F | 500+ | 500+ | 500+ |
| Water Washing Test, Percent Loss | 10 | 10 | None |
| Phase Changes Up to 400° F | Slight thinning out after loss of water | | |
| Lubrication Life, Hours (250° F.–10,000 r.p.m.) | 600+ | | |
| Norma Hoffman Oxidation Test (hrs. to 5 p.s.i. drop) | 230 | | |

The above data show that amorphous silica, silica gel and related materials are capable of stabilizing colloidal dispersions of alkali or alkaline earth metal salts of low molecular weight carboxylic acids in lubricating oils.

The invention is not necessarily limited to the specific conditions and materials of the foregoing examples. These conditions and materials may be varied within the limits indicated in the general portions of the specification. Moreover, conventional grease additives such as oxidation inhibitors, pour point depressors, corrosion inhibitors, extreme pressure agents and the like can be effectively incorporated in the grease compositions of this invention.

What is claimed is:

1. A lubricant composition comprising a major amount of a lubricating oil, in the range of 5–40 wt. percent of an alkaline earth metal salt of a low molecular weight carboxylic acid having in the range of 1–3 carbon atoms per molecule as the sole carboxylic acid salt, and in the range of 0.5–10 wt. percent of a polyethylene resin having a molecular weight in the range of 6,000–200,000.

2. The composition of claim 1 wherein said lubricating oil is a mineral lubricating oil.

3. The composition of claim 1 containing in addition thereto a minor amount of an alkaline earth metal salt of an inorganic acid.

4. A lubricating oil composition consisting of a major amount of mineral lubricating oil, .5 to 10 wt. percent of polyethylene having a molecular weight of 6,000 to 200,000 and 5 to 40 wt. percent of calcium acetate.

5. The method of preparing a lubricating grease composition containing as the sole carboxylic acid salt an alkaline earth metal salt of a $C_1$ to $C_3$ carboxylic acid, which comprises dispersing in a mineral lubricating oil in the range of 0.5–10 wt. percent of a polyethylene resin having a molecular weight in the range of 6,000–200,000, heating the dispersion to a temperature in the range of 300–450° F., then cooling said dispersion and adding thereto an alkaline earth metal hydroxide and in the range of 4–30 wt. percent of a low molecular weight carboxylic acid having in the range of 1–3 carbon atoms per molecule, and subsequently cooling the composition.

6. The method of claim 5 wherein said alkaline earth metal hydroxide is calcium hydroxide and wherein said low molecular weight carboxylic acid is acetic acid.

7. A method of obtaining a stable dispersion of calcium acetate as the sole carboxylic acid salt in lubricating oil which comprises forming an admixture of a mineral lubricating oil and in the range of 0.5 to 10 wt. percent of a polyethylene resin having a molecular weight in the range of 6,000 to 200,000, heating said mixture to a temperature in the range of 300° to 450° F., cooling said mixture and then adding calcium hydroxide and in the range of 4 to 30 wt. percent of acetic acid, forming thereby calcium acetate in a dispersed form.

References Cited in the file of this patent

UNITED STATES PATENTS

| | | |
|---|---|---|
| 2,513,680 | Schott et al. | July 4, 1950 |
| 2,607,735 | Sproule et al. | Aug. 19, 1952 |
| 2,618,599 | King et al. | Nov. 18, 1952 |
| 2,833,718 | Morway et al. | May 6, 1958 |

FOREIGN PATENTS

| | | |
|---|---|---|
| 710,109 | Great Britain | June 9, 1954 |